United States Patent
Mangone, Jr.

(10) Patent No.: US 6,298,549 B1
(45) Date of Patent: Oct. 9, 2001

(54) APPARATUS AND DEVICE FOR FORMING AN ENCLOSURE

(76) Inventor: Peter G. Mangone, Jr., P.O. Box 3128, Evergreen, CO (US) 80437

( * ) Notice: Subject to any disclaimer, the term of this patent is extended or adjusted under 35 U.S.C. 154(b) by 0 days.

(21) Appl. No.: 09/439,464

(22) Filed: Nov. 15, 1999

(51) Int. Cl.[7] .................................................. B23Q 7/10
(52) U.S. Cl. ........................ 29/809; 29/243.5; 29/243.56; 24/543
(58) Field of Search ........................ 29/434, 809, 243.5, 29/243.56; 227/82, 89; 24/543, 489, 516; 140/53, 57

(56) References Cited

U.S. PATENT DOCUMENTS

| | | | |
|---|---|---|---|
| 1,855,325 | * 4/1932 | De Witt Stone, Sr. et al. | 24/516 |
| 4,581,481 | * 4/1986 | Moretti | 29/243.56 |
| 4,798,231 | * 1/1989 | Glaus et al. | 140/57 |
| 4,801,061 | 1/1989 | Mangone, Jr. | 227/120 |
| 5,020,355 | * 6/1991 | Payne et al. | 140/57 |
| 5,350,267 | 9/1994 | Mangone, Jr. | 411/442 |
| 5,729,872 | * 3/1998 | Ginocchio | 24/543 |
| 5,938,099 | * 8/1999 | Ciccarelli | 227/19 |

* cited by examiner

Primary Examiner—S. Thomas Hughes
Assistant Examiner—Jermie. E. Cozart
(74) Attorney, Agent, or Firm—Klaas, Law, O'Meara & Malkin, P.C.; Joseph J. Kelly, Esq.

(57) ABSTRACT

A device having two elongated members pivotally connected at one end portions thereof and locked together at the other end portions thereof so that at least portions of at least two relatively rigid articles are enclosed therein and apparatus and method for moving the device from an opened position to a closed position forming an enclosure to contain the portions of the at least two relatively rigid articles. In a preferred embodiment, the two relatively rigid articles comprise radiant heating tubing and a wire mesh supported on a bed of particulate material.

15 Claims, 4 Drawing Sheets

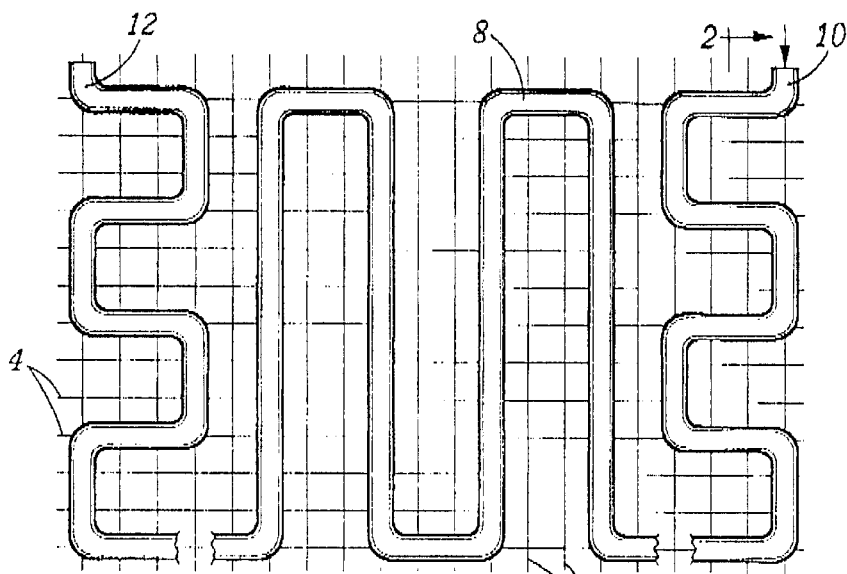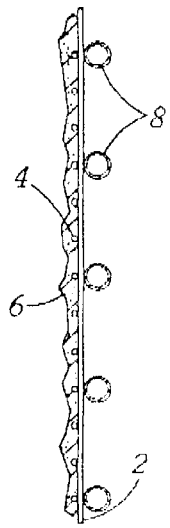
Figure 1
Figure 2
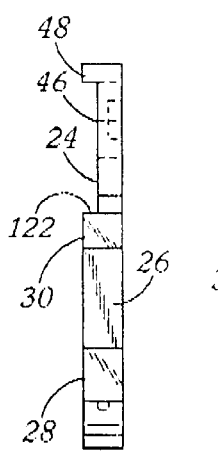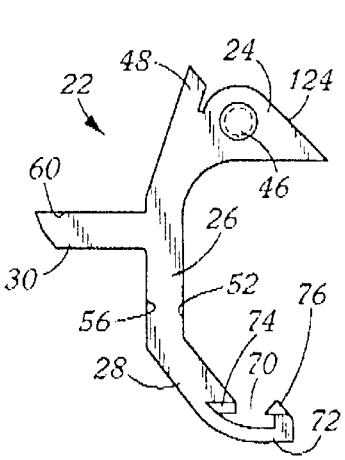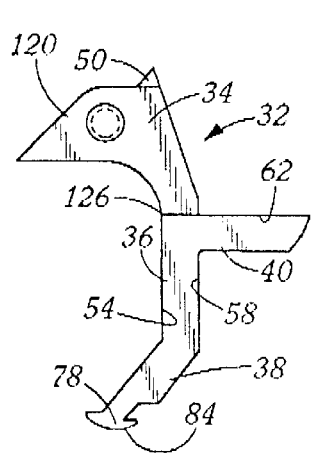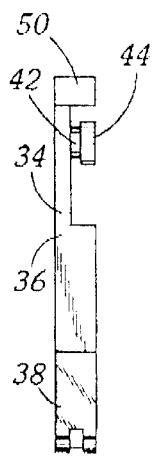
Figure 3
Figure 4
Figure 5
Figure 6
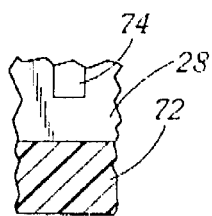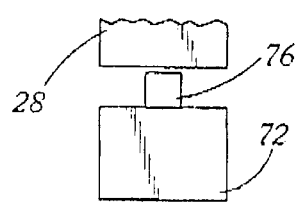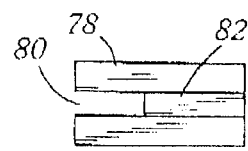
Figure 7
Figure 8
Figure 9

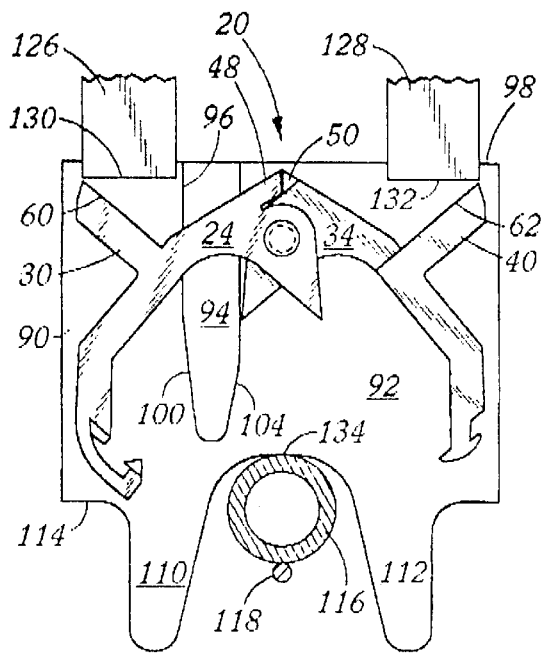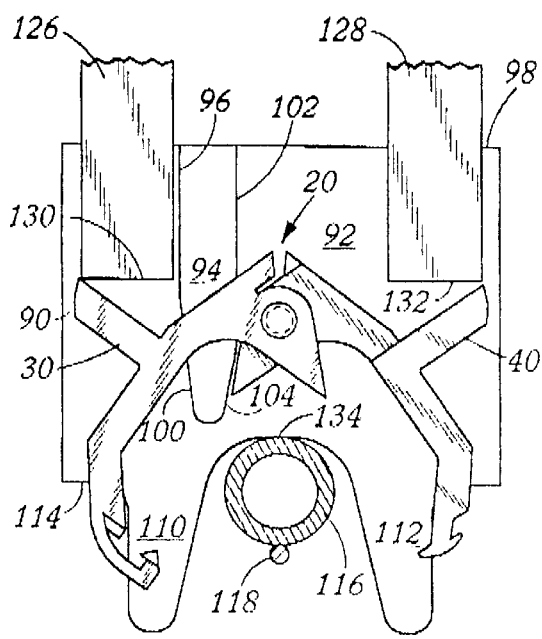
Figure 10     Figure 11
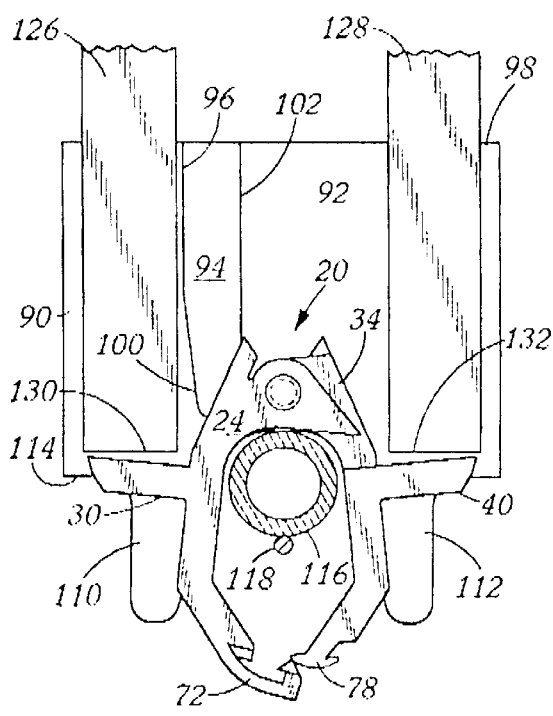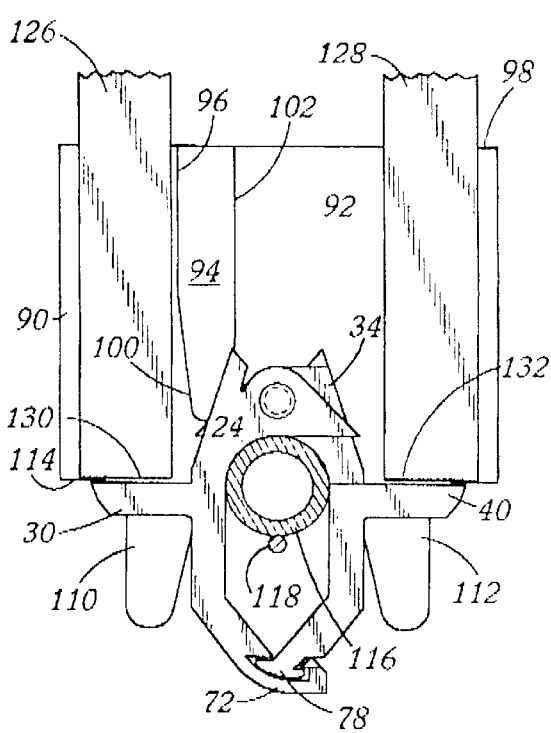
Figure 12     Figure 13

APPARATUS AND DEVICE FOR FORMING AN ENCLOSURE

FIELD OF THE INVENTION

This invention relates generally to a device for forming an enclosure for portions of at least two relatively rigid articles and more particularly to a device for enclosing portions of at least two relatively rigid articles in an adjacent relationship but to permit limited relative movement therebetween.

BACKGROUND OF THE INVENTION

In many instances, it is desirable to enclose portions of a plurality of relatively rigid articles in a close relationship. In some instances, the close relationship permits relative movement between the relatively rigid articles and in other instances such relative movement is not permitted or at least is restrained. In one such instance, relative movement is permitted during the formation of a final product but is not permitted after the final product has been formed. Such instance relates to the provision of radiant heating for a driveway. In one system for providing such radiant heating, the radiant heating tubing is attached to a wire mesh as the radiant heating tubing is being placed over the wire mesh in a desired relationship. This attachment is accomplished using ties of various constructions which are wrapped around portions of the wire mesh and the radiant heating tubing. In some instances, where additional strength is required, conventional rebar is added to the wire mesh or the conventional rebar is used in place of the wire mesh. In either construction, conventional ties are used either to locate the conventional rebar or to attach the radiant heating tubing to the conventional rebar. In other types of construction wherein conventional rebar is used to strengthen a structure, such as those using cement or concrete, the pieces of conventional rebar are attached together using the conventional ties as or before they are moved into the desired location. While the conventional ties do function for their intended purpose, the workers who use them find them time consuming and bothersome. Therefore, there exists a need for a different system other than the use of the conventional ties.

BRIEF DESCRIPTION OF THE INVENTION

This invention provides a device that can be used in a modification of a conventional tool to enclose in an automatic operation portions of at least two relatively rigid articles in a desired relationship. In the preferred embodiments of the invention, the at least two relatively rigid articles comprise portions of the wire mesh or rebar and portions of the radiant heating tubing used in the installation of radiant heating at desired locations.

In a preferred embodiment of the invention, a device for enclosing at least two relatively rigid articles in a desired relationship is provided and comprises at least two members each having an inner surface and an outer surface. Each of the at least two members is elongated and has a central body portion, an integral pivot portion, an integral locking portion and an abutment portion extending outwardly from a portion of the outer surface. The pivot apparatus provides a pivotal connection for mounting the at least two members for pivotal movement between opened and closed positions. An abutment stop is provided on each of the pivot portions for limiting the pivotal movement of the at least two members in the opened position. The locking portion on one of the at least two members comprises a flexible end portion having a recess formed therein, and the locking portion on the other of the at least two members comprises an end portion having a configuration to mate with the recess. A first guide projects outwardly from a portion of the flexible end portion adjacent to one side of the recess and a second guide projects inwardly from another portion of the end portion adjacent to an opposite side of said recess. A slot is formed in a portion of the outer surface of the end portion and is located to pass over the first guide and to receive therein at least a portion of the second guide. Also, a recess is formed in an adjacent portion of the outer surface of the other end portion next to the slot to receive therein at least a portion of the second guide.

Apparatus for moving the above-described device from an opened position to a closed position so as to enclose at least two relatively rigid articles uses a modification of a conventional tool wherein a feed track supports a row of devices in an opened position and urges the row of devices in a direction toward an end plate of the tool so that the forewardmost device of the row of devices is urged against end plate. The end plate has a generally planar surface to be contacted by the facing surface of the foremost device. The tool also has a force applying apparatus for applying an equal amount of force to the spaced apart abutment portions of the device. A guide projects inwardly from the generally planar surface toward the row of clips and has a first guiding surface and, spaced therefrom, a second guiding surface. The foremost device in the row of devices is urged against the generally planar surface of the end plate so that a portion of one of the at least two members is facing one of the first and second guiding surfaces and a portion of the other of the at least two members is facing the other of the first and second guiding surfaces. The force applying apparatus is located relative to the abutment portions so that the force applying apparatus contacts the abutment portions to apply a force thereto to move the portions of the at least two members into contact with the first and second guiding surfaces and to move the portions of the at least two members over the first and second guiding surfaces. The first and second guiding surfaces are contoured to move the at least two members from an opened position to a closed position containing the at least two relatively rigid members between the at least two members. The flexible end portion and the end portion are located so that the application of force on the abutment portions moves the end portion into contact with the flexible end portion to move the flexible end portion so that the end portion can move into the recess. The pivot portions of the two members of the device have a total thickness which is slightly less than the thickness of the central body portion, the locking portion and the abutment portions so that substantially all of the facing surface of the device contacts the generally planar surface of the end plate. In a preferred embodiment of the invention, the pivot portion having the pivot pin has a thickness less than the thickness of the other pivot portion. Each of the first and second guiding surfaces has a straight portion and a tapered portion. The force applying apparatus applies substantially the same amount of force to each of the abutment portions. Also, the end plate has two spaced apart prongs projecting from a lower edge thereof to assist in locating the at least two relatively rigid articles into a position to be enclosed by the device. In some instances, the end plate may be provided with a stop projecting from the generally planar surface of the end plate located between the prongs for limiting the movement of the device over the end plate. In preferred embodiments of the invention, the cross-sectional area defined by the inner surfaces when the device is in a closed position is substantially greater than the cross-sectional area of the relatively rigid articles contained therein. If desired, the device can be dimensioned so that at least portions of the relatively rigid articles within the device when in a closed and locked position are in contacting relationship with portions of the inner surface of the device and portions of each other.

The invention also provides a method for moving a device from an opened position to a closed position so as to enclose at least two relatively rigid articles using a modification of a conventional tool wherein a feed track supports a row of devices in an opened position and urges the row of devices in a direction toward an end plate of the tool so that the foremost device of the row of devices is urged against the end plate and the tool also has force applying apparatus for applying an equal amount of force to spaced apart portions of the device and wherein the end device is formed from a relatively rigid material, is elongated and has at least two members being pivotally connected together at one end portions thereof for pivotal movement about a longitudinal axis and having locking apparatus at the other end portions thereof and has an inner surface and an outer surface. The method comprises applying an equal amount of force on spaced apart portions of the end device to move at least a portion of one of the at least two members into contact with a first guiding surface on the end plate and at least a portion of the other of the at least two pivotally connected members into contact with a second guiding surface on the end plate so that the locking end portions are in a spaced apart relationship; moving the at least two members over the end plate while maintaining the contact of the portions of the at least two members in contact with the first and second guiding surfaces; forming the first and second guiding surfaces so that the end portions, having the locking apparatus, are moved toward each other; locating the at least two members so that at least two relatively rigid articles are located between the inner surfaces of the at least two members; and moving the end portions having the locking apparatus together so that the end device moves into a closed position with the at least two relatively rigid articles contained therein. The method further comprises stopping the movement of the pivotally connected end portions over the end plate; and applying a sufficient force on the spaced apart portions to move the end portions having the locking apparatus so that the other end member flexes the flexible arm and as the movement is continued and snaps into the recess to lock the end portions together. The method further comprises guiding the other end portion over the flexible arm to restrain relative movement therebetween in a longitudinal direction; and restraining relative movement between the other end portions in a longitudinal direction when in a locked together position.

When the two relatively rigid articles comprise at least a portion of a tubing for radiant heating and at least a portion of a wire mesh for supporting the radiant tubing on a bed of particulate material, the method further comprises embedding at least a portion of the closed and locked end device in the particulate material.

BRIEF DESCRIPTION OF THE DRAWINGS

Illustrative and presently preferred embodiments of the invention are shown in the accompanying drawings in which:

FIG. 1 is a top plan view of a portion of a conventional radiant heating structure for use in providing radiant heating for a suitable location such as a driveway;

FIG. 2 is a cross-sectional view taken on the line 2—2 of FIG. 1;

FIG. 3 is an end elevational view taken from the left side of FIG. 4;

FIG. 4 is an elevational view of one member of the device of this invention;

FIG. 5 is an elevational view of the other member of the device of this invention;

FIG. 6 is an end elevational view taken from the left side of FIG. 5;

FIG. 7 is an end elevational view, with parts removed, of the lower portion of FIG. 4 looking from the right of FIG. 4;

FIG. 8 is an end elevational view of the lower portion of FIG. 4 looking from the right of FIG. 4;

FIG. 9 is a bottom plan view of a portion of FIG. 5;

FIGS. 10–13 illustrate the movement of a device of this invention from an opened position to a closed position;

DETAILED DESCRIPTION OF THE INVENTION

Figure 14:
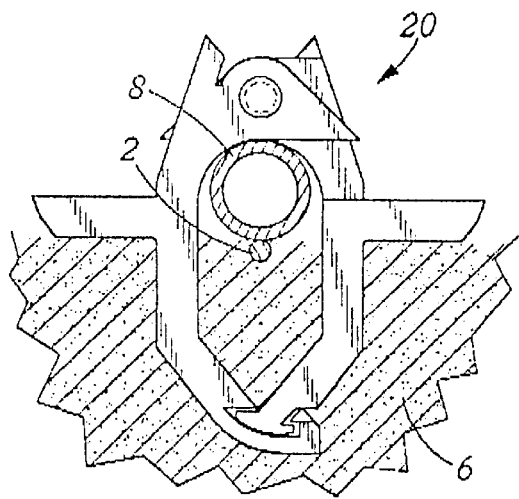
FIGS. 14–17 illustrate the use of the device of this invention with a section of radiant heating tubing and a wire mesh.

In FIGS. 1 and 2, there is illustrated one of the many types of different installation designs used to provide radiant heating for a variety of structures such as driveways, athletic fields and others. The type illustrated in FIGS. 1 and 2 comprises a conventional wire mesh comprising intersecting wires 2 and 4 which are secured together at least at various intersections. The wire mesh is preferably laid over a bed of particulate material, which as illustrated in FIG. 2 comprises conventional sand 6 but can comprise other types of particulate material such as pebbles, styrofoam, and other materials having similar characteristics. Radiant heating tubing 8 is installed over the wire mesh. As illustrated in FIG. 1, the radiant heating tubing 8 has a plurality of straight sections and integral curved sections that extend in different directions. The radiant heating tubing 8 has an inlet 10 and an outlet 12 so that a heating fluid may be passed through the radiant heating tubing. It is understood that there will be many sections of radiant heating tubing 8 for an overall structure. The wires 2 and 4 forming the wire mesh typically have diameters of between about 0.156 and 0.500 inch and the radiant heating tubing may have diameters between about 0.375 and 0.875 inch.

The construction of the device 20, FIG. 10, of this invention is illustrated in FIGS. 3–9 and comprises one member 22 comprising a pivot portion 24; a central body portion 26, preferably integral with the pivot portion 24; a locking portion 28, preferably integral with the central body portion 26; and an abutment portion 30, preferably integral with the central body portion 26 and extending outwardly therefrom. Another member 32 comprises a pivot portion 34; a central body portion 36, preferably integral with the pivot portion 34; a locking portion 38, preferably integral with the central body portion 36; and an abutment portion 40, preferably integral with the cental body portion 36 and extending outwardly therefrom. In a preferred embodiment of the invention, the central body portions 26 and 36, the locking portions 28 and 38 and the abutment portions 30 and 40 have substantially the same thickness. In this embodiment of the invention, the thickness of the pivot portion 34 having the pivot pin 42 is not as thick as the pivot portion 24 having the circular opening 46. The ratio between the thicknesses of the pivot portions 24 and 34 depends upon the size of the members 22 and 32 and the material from which they are formed. This structure is desirable for the pivot arrangement illustrated in this invention. If the pivot arrangement is different, such as a recessed opening in each of the pivot portions 24 and 34 so that the pivot portions 24 and 34 could be pivotally connected by a rivet, then the thicknesses of the pivot portions 24 and 34 could be substantially the same. In any event, the total thickness of the pivot portions 24 and 34 is slightly less than any of the thicknesses of the central body portions 26 and 36, the locking portions 28 and 38 and the abutment portions 30 and 40. In one embodiment of the invention, each of the central body portions 26 and 36; the locking portions 28 and 38 and the abutment portions 30 and 40 has a thickness of about 0.250 inch; the pivot portion 24 has a thickness of about 0.145 inch and the pivot portion 34 has a thickness of about 0.100 inch.

A pivot pin 42 is integral with the pivot portion 34 and projects outwardly therefrom. The pivot pin 42 has an enlarged head portion 44 having a diameter larger than the diameter of the pivot pin 42. The pivot portion 24 has a circular opening 46 extending therethrough with a portion having a diameter to mate with the pivot pin 42 and a portion having a diameter to mate with the enlarged head portion 44. As illustrated in FIG. 10, the pivot portions 24 and 34 are pivotally joined together by press fitting the pivot pin 42 and the enlarged head portion 44 through the opening 46 so as to pivot around a longitudinal axis. The pivot portion 24 has an abutment 48 projecting outwardly therefrom, and the pivot portion 34 has an abutment 50 projecting outwardly therefrom. As illustrated in FIG. 10, the abutments 48 and 50 move into an abutting relationship to limit the movement of the device 20 in an opened position.

The member 22 and the another member 32 have facing inner surfaces 52 and 54 and outer surfaces 56 and 58. The abutment 30 has an abutment surface 60 and the abutment 40 has an abutment surface 62.

The locking portion 28 has a recess 70 formed by a flexible arm 72. At one end of the recess 70, there is a downwardly projecting stop 74 for a purpose described below. At the other end of the recess 70, the flexible arm 72 is provided with an upwardly projecting guide 76 for a purpose described below. The locking portion 38 has a hook portion 78 that is contoured to cooperate with the recess 70 to hold the member 22 and the another member 32 locked together when in a completely closed position as illustrated in FIG. 13. The hook portion 78 has a slot 80, FIG. 9, formed in the portion thereof facing the locking portion 28 and an arcuate recess 82 formed in its bottom surface 84. As described below, as the member 22 and the another member 32 are moved toward a closed position, the slot 80 moves over the guide 76 and the bottom surface 84 of the hook portion 78 moves the flexible arm 72 downwardly. The arcuate recess 82 then moves over the guide 76 to guide the further movement of the hook portion 78. The slot 80 then moves over the stop 74 and the hook portion 78 moves into the recess 70 as the flexible arm 72 resiles back to its original position. In preferred embodiments of this invention, the member 22 and the another member 32 are each integrally molded using a plastic material comprising a polyethylene; a nylon or other materials having similar characteristics.

The movement of the device 20 from an opened position illustrated in FIG. 10, to a closed position, illustrated in FIG. 13, is controlled by a modification of a conventional tool of the type illustrated in U.S. Pat. Nos. 4,801,061 and 5,350,267 which are incorporated herein by reference thereto. In such a modification of a conventional tool, a plurality of devices 20 in the opened position, illustrated in FIG. 10, are supported on a magazine and preferably resiliently urged toward an end plate 90, illustrated in FIGS. 10–13. In this tool, an end device 20 is resiliently urged against a generally planar surface 92 of the end plate 90. As illustrated in FIGS. 3 and 6 and as explained above, the pivot portions 24 and 34 have a total thickness which is slightly less than the thickness of the central body portions 26 and 36, the locking portions 28 and 38 and the abutment portions 30 and 40 so that the facing surface of the foremost device 20 is compatible with the generally planar surface 92.

The end plate 90 has a guide 94 that, in a preferred embodiment, projects outwardly from the generally planar surface 92 for a distance that is the smaller of the differences between the thickness of either of the pivot portions 24 and 34 versus the thickness of the central body portions 26 and 36. The guide 94 has a first guiding surface and a second guiding surface. As illustrated in FIGS. 10–13, the first guiding surface has a first portion 96 that extends downwardly from and is perpendicular to the top edge 98 of the end plate 90 and a second portion 100 that is inclined to the first portion 96, which in the embodiment of the invention described above is about 12 degrees. The second guiding surface is spaced from the first guiding surface and has a first portion 102, FIGS. 11–13, that extends downwardly from and is perpendicular to the top edge 98 of the end plate 90 and a second portion 104, FIGS. 10 and 11, that is inclined to the first portion 102, which in the embodiment of the invention described is about 10 degrees. In the embodiment of the invention described above, the first portion 96 has a linear extent of about 1.250 inch; the second portion 100 has a linear extent of about 0.875 inch; the first portion 102 has a linear extent of about 1.625 inch and the second portion 104 has a linear extent of about 0.500 inch. It is to be understood that the foregoing dimensions are for a device 20 having a specific size, as described above, and the first and second guiding surfaces may be designed with different dimensions to cooperate with different sizes of devices which are sized to cooperate with the different sizes of the relatively rigid articles to be enclosed within the device 20.

The end plate 90 has two spaced apart prongs 110 and 112 extending downwardly from the lower edge 114 of the end plate 90 and are sized so that portions of various relatively rigid articles will be positioned therebetween and in FIGS. 10–13, the relatively rigid articles comprise a portion 116 of the radiant heating tubing 8 and a portion 118 of one of the wires 2 and 4 which are positioned therebetween as the device 20 is closed about them as described below. As illustrated in FIG. 10, when the foremost device 20 is moved into contact with the generally planar surface 92, the surface 120 of the pivot portion 34, FIG. 5, faces the first portion 102 and edge 122 of the abutment 30, FIG. 3, faces the first portion 96. It is understood that the position of the end device 20 may be reversed so that the surface 124 of the pivot portion 24 faces the first portion 102 and the edge 126, FIG. 5, faces the first portion 96. When the portions of the pivot portions 24 and 34 are in contact with the first portions 96 and 102, a recess is formed into which the guide projects. As stated above, the thickness of this recess is not greater than the smaller of the differences between the thickness of either of the pivot portions 24 and 34 and the thickness of the central body portions 26 and 36.

The movement of the end device 20 from an opened position to a closed position is illustrated in FIGS. 10–13. In FIG. 10, the foremost device 20 has been moved against the generally planar surface 92 so that the surface 120 faces the first portion 102 and the edge 122 faces the first portion 96. The tool has two spaced apart force applying plungers 126 and 128 having lower surfaces 130 and 132 located to contact a portion of the abutment surfaces 60 and 62 to apply an equal amount of force to the abutments 30 and 40. As the plungers 126 and 128 begin to apply the force, at least a portion of the surface 120 moves into contact with the first portion 102 and the edge 122 moves into contact with the first portion 96. As the force is continued to be applied, the foremost device 20 is moved over the generally planar surface 92 with at least a portion of the surface 120 is in contact with the second portion 104 and the edge 122 is in contact with the second portion 100 so that the end device 20 has been moved into a partially closed position as illustrated in FIG. 11. As the foremost device 20 continues to be moved downwardly over the generally planar surface 92, the edge 122 moves out of contact with the second portion 100 and another portion of the surface 120 is in contact with the second portion 104 as illustrated in FIG. 12. The lower edges of the pivot portions 24 and 34 have moved into contact with the portion 116 to stop the movement of the foremost device 20 over the generally planar surface 92. The locking portions 28 and 38 have been moved toward each other so that the hook portion 78 has moved into contact with the flexible arm 72 to begin to apply a force thereto and the portions 116 and 118 are enclosed within the inner surfaces 52 and 54 of the member 22 and the another member 32. The plungers 126 and 128 continue to apply a force to the abutments 30 and 40 to move the locking members 28 and 38 so that the hook portion 78 deflects the flexible arm 72 and snaps into the recess 70 as the flexible arm 72 resiles as described above and illustrated in FIG. 13. As illustrated in FIG. 13, the area enclosed by the inner surfaces 52 and 54 is substantially greater than the area of the portions 116 and 118. This is an acceptable arrangement when the device 20 is being used in the installation of radiant heating tubing 8 over the wire mesh having the wires 2 and 4. This arrangement will permit the concrete or other similar material to be poured over the radiant heating tubing 8 and the wire mesh without undue movement of the radiant heating tubing 8. However, it is understood that the device 20 can be designed to provide less movement of the relatively rigid materials to be enclosed within the inner surfaces 52 and 54. Some of the examples of such devices 20 and the relatively rigid articles enclosed therein are disclosed and described in relation to FIGS. 14–23.

The tool may be used to install the device 20 to enclose the relatively rigid articles in a number of ways. If the particulate material is of such a size that it will not clog the recess 70 or if no particulate material is being used, the tool is positioned over the top relatively rigid article with the portion 134 of the end plate 90 in contact therewith and the device 20 is then moved over the relatively rigid articles as described above.

If the particulate material is of a size that it might fill the recess 70, such as the sand of FIGS. 1 and 2 under the wire mesh tubing, it may be desirable to lift a portion of the wire mesh and the radiant heating tubing from the sand and place the portion 134, FIGS. 10 and 11, of the end plate 90 in contact with a portion of the radiant heating tubing 8. The foremost device 20 is then moved over the generally planar surface as described above to enclose portions of the wire mesh and the radiant heating tubing. After being enclosed, the lower portion of the device 20 may be embedded into the sand.

Figure 15:
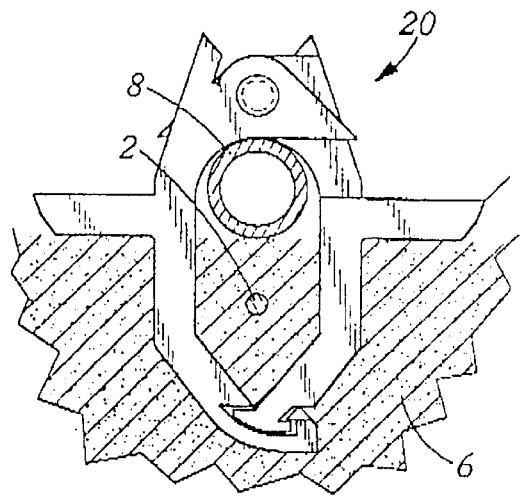

FIG. 14 illustrates the use of the device 20 as described above to enclose portions of the relatively rigid wire 2 of the wire mesh and the radiant heating tubing 8. As illustrated in FIG. 14, portions of the wire 2 and the radiant heating tubing 8 are in a contacting relationship and a portion of the wire 2 is embedded in the sand 6. However, the wire 2 may move away from the radiant heating tubing 8 to one of several locations in the sand 6. One such location is illustrated in FIG. 15.

Figure 16:
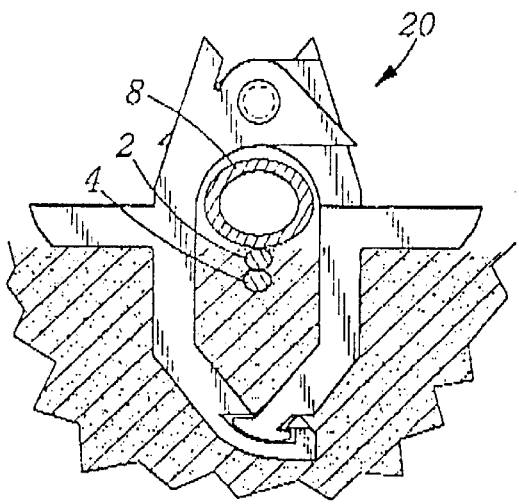
Figure 17:
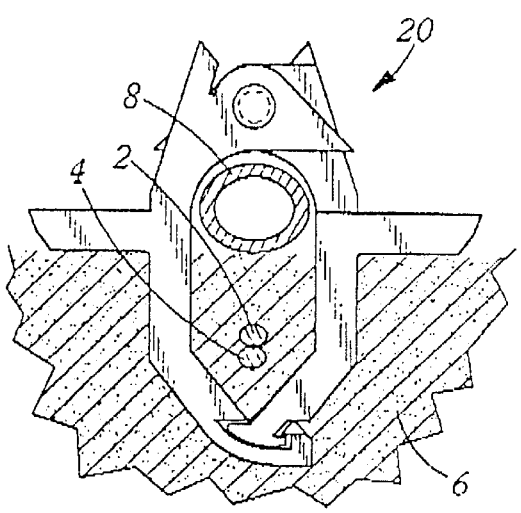

FIG. 16 is similar to FIG. 14 but illustrates the installation of the device 20 at a location of the intersection of the wires 2 and 4 of the wire mesh. As illustrated in FIG. 16, portions of the wires 2 and 4 are in a contacting relationship and portions of the wire 2 and the radiant heating tubing 8 are in a contacting relationship. Also, the wires 2 and 4 are embedded into the sand 6. FIG. 17 is similar to FIG. 15 in that the wires 2 and 4 are spaced at one of many locations from the radiant heating tubing. It is understood that after being enclosed within the device 20, at least portions of the radiant heating tubing 8 may also be embedded into the sand 6 either by accident or design.

Figure 18:
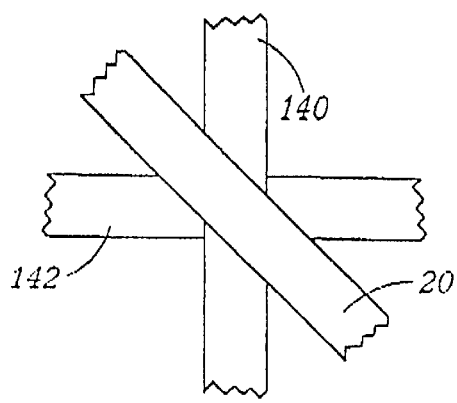
FIG. 18 is a schematic top plan view of the device of this invention installed over an intersection of conventional rebar.
Figure 19:
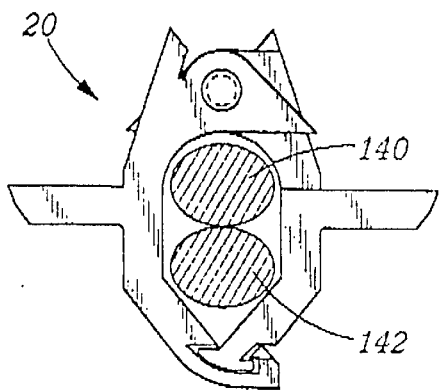
FIG. 19 is a cross-sectional view of the conventional rebar of FIG. 18 enclosed within the device of this invention.

FIGS. 18 and 19 illustrate the use of the device 20 to enclose any two relatively rigid articles 140 and 142 for any desired purpose. For example, the relatively rigid articles could be conventional rebar that is used to reinforce any type of structure using concrete or a material having similar characteristics or any two linear or curved cylindrical objects. The device 20 in FIGS. 18 and 19 has dimensions differing from the dimensions of the device 20 illustrated in FIGS. 10–17 so that the dimensions of the device 20 also differ. In FIGS. 18 and 19, the two relatively rigid articles are enclosed at an intersection. However, they can also be enclosed by a device 20 when they are in a parallel relationship.

Figure 20:
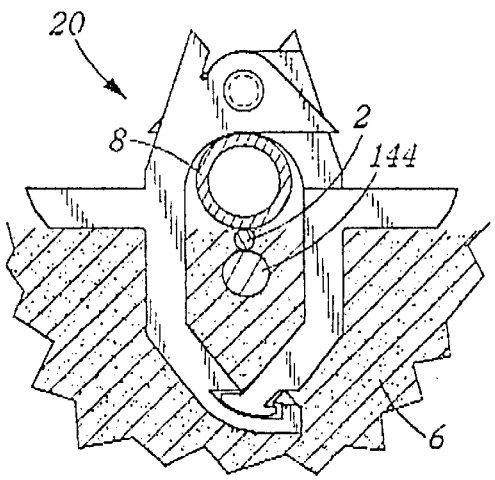
FIGS. 20–22 illustrate the use of the device of this invention with a section of radiant heating tubing, wire mesh and conventional rebar.

In some instances wherein it is desired to install radiant heating tubing the wires, 2 and 4 of the wire mesh do not provide sufficient reinforcement. In such instances, another reinforcing material, such as conventional rebar is used with the wire mesh. FIG. 20 illustrates the use wherein the device 20 encloses portions of a radiant heating tubing 8, a wire 2 and a conventional rebar 144 in a parallel relationship. In FIG. 20, portions of the rebar 144 and the wire 20 are in a contacting relationship and portions of the wire 2 and the radiant heating tubing are in a contacting relationship with the wire 2 and the rebar 144 embedded in the sand 6. It is understood, that these relatively rigid articles could be spaced from each other.

Figure 21:
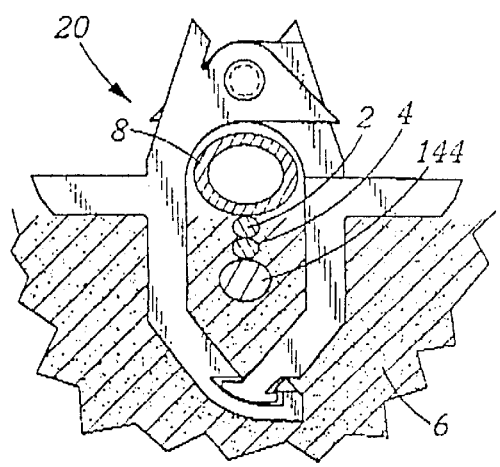

In FIG. 21, the device 20 is used at the intersection of the wires 2 and 4 and encloses portions of the radiant heating tubing 8, the wires 2 and 4 and the rebar 144. As described above, these relatively rigid articles could be in a spaced apart relationship.

Figure 22:
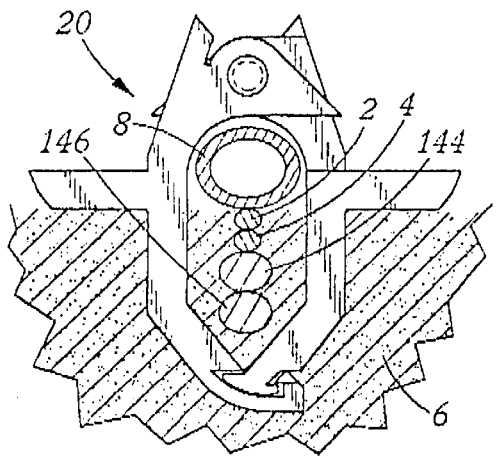

In FIG. 22, the device 20 is used at the intersection of the wires 2 and 4 and the intersection of two portions of rebar 144 and 146 and encloses portions of the radiant heating tubing 8, the wires 2 and 4 and the rebar 144 and 146. As discussed above, the radiant heating tubing 8, the wires 2 and 4 and the rebar 144 and 146 could be in a spaced apart relationship.

Figure 23:
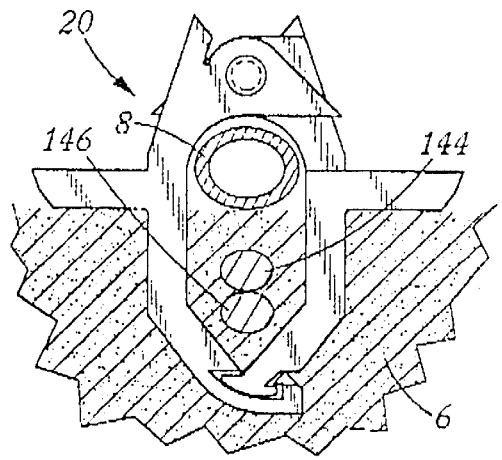
FIG. 23 illustrates the use of the device of this invention with a section of radiant heating tubing and the intersection of conventional rebar.

In some instances, the wires 2 and 4 can be omitted and the reinforcement may comprise only rebar 144 and 146. In FIG. 23, the device 20 is used at the intersection of the rebar 144 and 146. As discussed above, the rebar 144 can be in contact with the radiant heating tubing 8 or the rebar 144 and 146 could be in other locations spaced from the radiant heating tubing 8.

While illustrative and presently preferred embodiments of the invention have been described in detail herein, it is to be understood that the inventive concept may be otherwise variously embodied and employed and that the appended claims are intended to be construed to include such variations except insofar as limited by the prior art.

What is claimed is:

1. Apparatus for moving a device from an opened position to a closed position so as to enclose at least two relatively rigid articles using a tool wherein a feed track supports a row of devices in an opened position and urges the row of devices in a direction toward an end plate of the tool so that the foremost device of the row of devices is urged against the end plate and the tool also having force applying apparatus for applying an equal amount of force to spaced apart portions of the device comprising:

said device being formed from a relatively rigid material and having at least two pivotally connected members each having an inner surface and an outer surface;

each of said at least two members being elongated and having a central body portion, a pivot portion, a locking portion and an abutment portion;

said abutment portion extending outwardly from a portion of said outer surface;

said end plate having an generally planar surface;

at least one guide projecting outwardly from said generally planar surface toward said row of devices;

said guide having a first guiding surface and spaced therefrom a second guiding surface;

said device being urged against said end plate so that a portion of one of said at least two members is facing one of said first and second guiding surfaces and a portion of the other of said at least two members is facing the other of said first and second guiding surfaces;

said force applying apparatus being located relative to said abutment portions so that said force applying apparatus contacts said abutment portions to apply a force thereto to move said portions of said at least two members into contact with said first and second guiding surfaces and to move said portions of said at least two members over said first and second guiding surfaces; and said first and second guiding surfaces being contoured to move said at least two members from said opened position toward a closed position containing said at least two relatively rigid members between said inner surfaces of said at least two members.

2. Apparatus as in claim 1 and further comprising:

an abutment stop on each of said pivot portions for limiting the pivotal movement of said at least two members to said opened position.

3. Apparatus as in claim 1 wherein:

said locking portion of one of said at least two members comprises a flexible end portion forming a recess therein;

said locking portion on the other of said at least two members comprises an end portion having a configuration to mate with said recess; and said flexible end portion and said end portion being located so that said application of force on said abutment portions moves said end portion into contact with said flexible end portion to move said flexible end portion so that said end portion can move into said recess.

4. Apparatus as in claim 3 and further comprising:

a first guide projecting outwardly from a portion of said flexible end portion adjacent to one side of said recess;

a second guide projecting inwardly from another portion of said end portion adjacent to an opposite side of said recess;

a slot formed in a portion of said outer surface of said another end portion and is located to pass over said first guide and to receive therein at least a portion of said second guide when said at least two members move from said opened position to said closed position; and a recess formed in an adjacent portion of said outer surface next to said slot to receive therein at least a portion of said second guide during movement of said at least two members from said opened position to said closed position.

5. Apparatus as in claim 4 wherein:

each of said central body portions having substantially the same thickness; and each of said pivot portions having a thickness wherein the total thickness thereof is slightly less than any of the thicknesses of said central body portions so that substantially all of a facing surface of said device contacts said generally planar surface of said end plate.

6. Apparatus as in claim 1 wherein:

each of said first and second guiding surfaces having a straight portion and a tapered portion.

7. Apparatus as in claim 6 wherein:

said force applying apparatus applying substantially the same amount of force to each of said abutment portions.

8. Apparatus as in claim 7 and further comprising:

said end plate having two spaced apart prongs projecting from a lower surface thereof so that said at least two relatively rigid articles can be positioned therebetween.

9. Apparatus as in claim 8 and further comprising:

a stop projecting from said generally planar surface of said end plate and located between said prongs for limiting the movement of said device over said end plate.

10. Apparatus as in claim 9 wherein:

the cross-sectional area defined by said inner surfaces when said device is in a closed position is substantially greater than the cross-sectional area of the relatively rigid articles contained therein.

11. Apparatus as in claim 10 and further comprising:

said locking portion on one of said at least two members comprises a flexible end portion forming a recess therein;

said locking portion on the other of said at least two members comprises an end portion having a configuration to mate with said recess;

said flexible end portion and said end portion being located so that said application of force on said abutment portions moves said flexible end portion so that said end portion can move into said recess;

a first guide projecting outwardly from a portion of said flexible end portion adjacent to one side of said recess;

a second guide projecting inwardly from a portion of said end portion adjacent to an opposite side of said recess;

a slot formed in a portion of said outer surface of said end portion and located to pass over said first guide and to receive therein at least a portion of said second guide when said at least two members move from said opened position to said closed position; and a recess formed in an adjacent portion of said outer surface next to said slot to receive therein at least a portion of said second guide during movement of said at least two members from said opened position to said closed position.

12. Apparatus as in claim 1 wherein:

at least portions of the relatively rigid articles within said device when in a closed and locked position are in contacting relationship with portions of said inner surface of said device and portions of each other.

13. Apparatus as in claim 1 wherein:

said at least one guide projects outwardly for a distance that is not greater than the smaller of the differences between the thickness of either of said pivot portions and the thickness of said central body portions.

14. Apparatus as in claim 13 wherein:

one of said pivot portion having a thickness greater than the thickness of the other of said pivot portion;

each of said central body portions having substantially the same thickness; and each of said pivot portions having a thickness wherein the total thickness thereof is slightly less than any of the thicknesses of said central body portions so that substantially all of the facing surface of said device contacts said generally planar surface of said end plate.

15. Apparatus as in claim 1 wherein:

said integral pivot portion providing a pivotal connection for mounting said at least two members for pivotal movement between opened and closed positions and wherein said inner surfaces define an enclosed opening when in said closed position so that said at least two relatively rigid articles pass through said enclosed opening and are enclosed within said inner surfaces when said device is in said closed position.

* * * * *